May 15, 1962 — D. WILLISON ET AL — 3,034,659
CARGO HANDLING SYSTEM
Filed July 31, 1959 — 4 Sheets-Sheet 1

INVENTORS
DONALD WILLISON
BY DAVID J. WYROUGH
Henry Kozak
ATTORNEY

May 15, 1962 D. WILLISON ET AL 3,034,659
CARGO HANDLING SYSTEM
Filed July 31, 1959 4 Sheets-Sheet 2

INVENTORS
DONALD WILLISON
BY DAVID J. WYROUGH

Henry Kozak
ATTORNEY

May 15, 1962  D. WILLISON ET AL  3,034,659
CARGO HANDLING SYSTEM
Filed July 31, 1959  4 Sheets-Sheet 3

INVENTORS
BY DONALD WILLISON
DAVID J. WYROUGH
ATTORNEY Henry Kozak

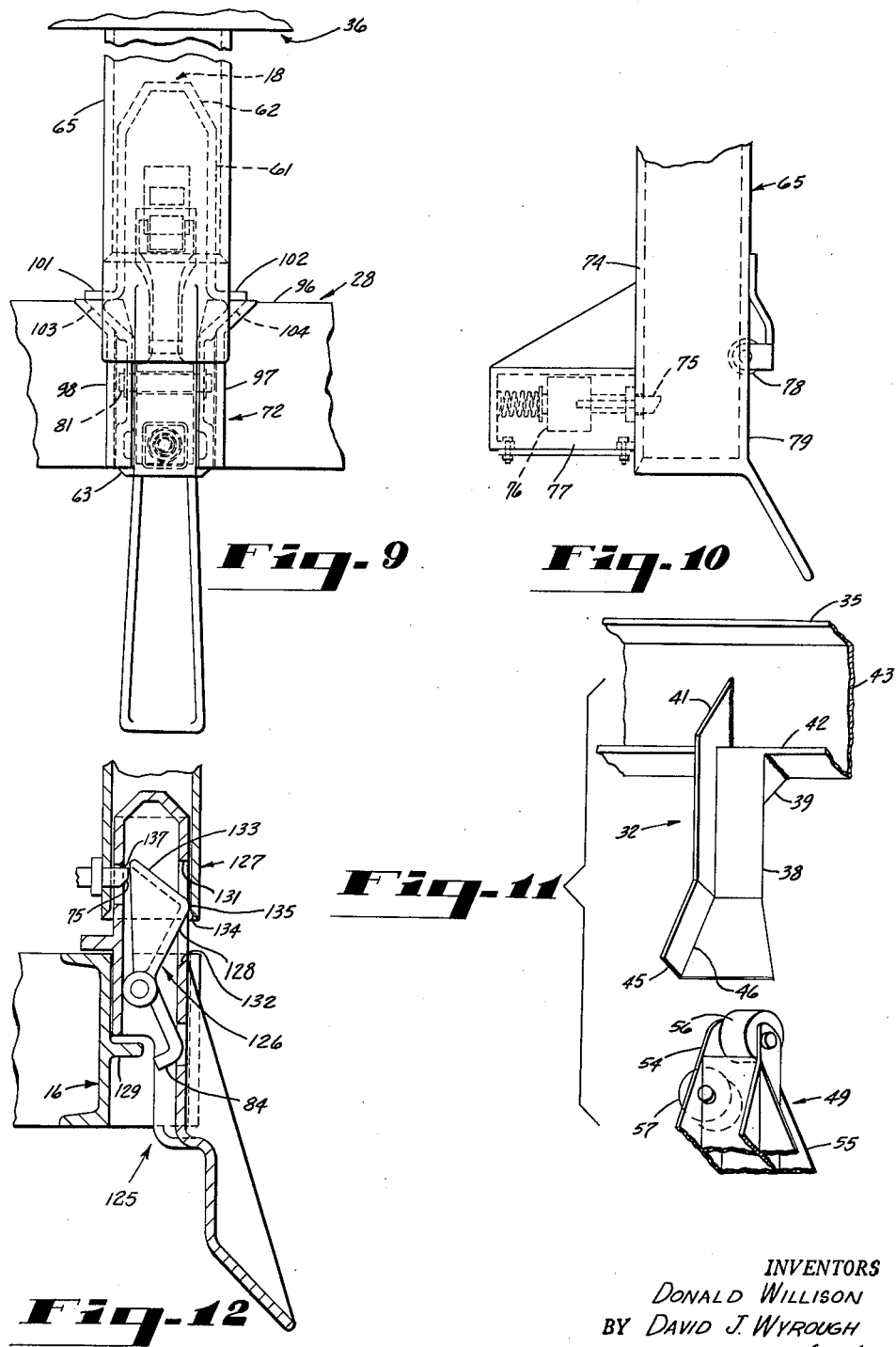

United States Patent Office 3,034,659
Patented May 15, 1962

3,034,659
CARGO HANDLING SYSTEM
Donald Willison, Lyndhurst, and David J. Wyrough, Maple Heights, Ohio, assignors to National Castings Company, a corporation of Ohio
Filed July 31, 1959, Ser. No. 830,847
19 Claims. (Cl. 212—14)

The present invention relates to a system for lifting cargo containers individually and bodily from one carrying or supporting medium to another. Specifically, it relates to transferable guides which may be temporarily attached to a hoisting implement adapted to couple directly to a cargo container or other article to guide the implement in its approach into coupling relation with the container.

There are a number of known systems for handling freight or cargo based upon the use of cargo containers and hoisting equipment for transferring the containers from one carrier or support to another.

Such hoisting equipment commonly includes a horizontally flat frame-like implement suspended from a crane on a cable-pulley system and adapted to be connected with the container at a number of points along its top or side portions.

A problem arising in the use of such an implement is that of bringing it quickly into superjacent and vertically aligned relation with the container, whereby coupling of the implement and the container may be effected manually or automatically very quickly. Positioning of the implement may be facilitated by guides attached to the frame-like implement which extend downwardly and outwardly with respect to the upper periphery of the container in a position just underneath the implement.

However, a hoisting implement (known in the trade to some extent as a "spreader") such as used in loading and unloading seagoing vessels, e.g., a vessel equipped with a vertical guide system for supporting the containers in stacks, must have a plan contour, i.e., a periphery in a horizontal plane, adapting it for entering the hold of a vessel which is within the top periphery or plan contour of the container to be received in the vessel. Any guides mounted on the implement for facilitating its coupling with a container supported, e.g., on a flatcar, necessarily extend laterally beyond the top periphery of the container. Such guides must be retracted from such outboard relation with the implement in order that it may pass without interference through hatch openings, between closely spaced stacks of containers, or within vessels constructed to carry the containers in closely spaced stacks.

Hence, it is a primary object of the present invention to provide a system for lifting articles of uniform shape and size from carrier to carrier which utilizes guides for properly aligning a lifting implement superjacently over one of such articles wherein the guides may be stored in unattached relation with the implement on another portion of the system when not in use.

A further object is to provide adequate control mechanism adapted for remote operation in releasing or securing a plurality of such guides with respect to operative and inoperative positions.

Another object is to provide guides suitable for use on cargo container handling equipment which do not require a lateral clearance beyond that required in their actual use as guides in being transferred to inoperative positions.

It is also an object to provide a cargo-container handling system using guides for aligning a hoisting implement with a work article which are selectively separable from the implement.

Still another object is to provide a container handling system in accordance with the foregoing objects adaptable generally to all types of hoisting equipment comprising a frame-like lifting implement carried by cable and pulley supporting mechanism of a horizontally traveling overhead crane.

A further object of importance is to equip a hoisting implement with guiding facilities with a minimum addition of weight and at a minimum of cost.

These and other objects are effectively accomplished through provision of a combination comprising a hoisting implement of generally horizontally-flat frame-like construction; a crane adapted, e.g., to run along a horizontal track and comprising a chassis for supporting the implement, and elevating means, such as a cable and pulley mechanism for raising and lowering the implement with respect to the chassis along a path in generally fixed relation therewith; and a guide transferable between the chassis and the implement and adapted to be carried by the implement in engaging an article to be lifted by the implement and aligning the implement superjacently with the article during the coupling of one to the other. The combination further includes means of attachment comprising elements on the chassis, the implement, and the guide for attaching the guide to the chassis or the implement as desired. The elements on the implement and chassis are relatively positioned for supporting the guide along an axis generally parallel to the path followed by the implement relative to the chassis. The elements thereof cooperate slidably with the elements on the guide in the attaching and releasing operations which are entailed in the transfer of the guide between the chassis or the implement. The elements of the chassis and the implement are aligned relative to the axis followed by the guide to maintain a fixed alignment of the guide relative to the axis. By operation of the elevating means, the implement is movable into a position of immediate vertical proximity with the chassis to disposed the elements of the implement and chassis in simultaneous engagement with the elements of the guide. In a preferred embodiment, the elements include mechanism for selectively releasing the engaged elements of the guide and the chassis, or the elements of the guide and the implement, for effecting transfer of the guide from one to the other.

In the accompanying drawing with respect to which the invention is described:

FIG. 9 is a fragmentary elevation, as viewed in a direction looking horizontally inwardly of the hoisting implement of the chassis, a hoisting implement, and a guide in guide-transferring position.

FIG. 10 is a fragmentary side elevation of an open bottom guide receptacle of the overhead crane chassis.

FIG. 11 is a perspective fragmentary view of a pair of cooperating guide portions of the crane chassis and lifting implement.

FIG. 12 is a fragmentary side elevation in section of a modified guide shown supported by the crane chassis and in position for being transferred to a subjacent hoisting implement.

Figure 1:
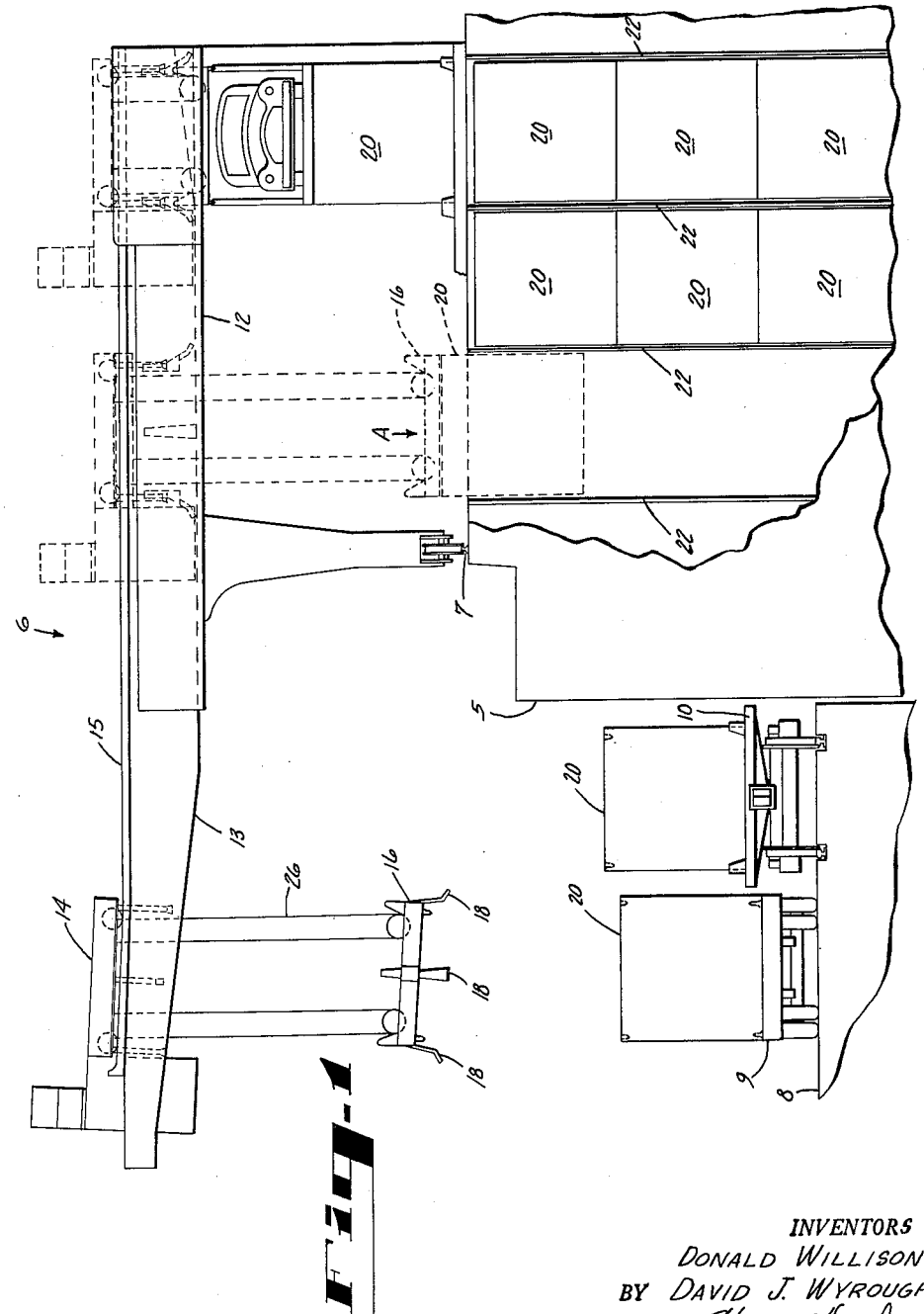
FIG. 1 is a schematic elevation illustrating a ship and gantry crane mounted thereon for supporting the implement of FIGS. 2 to 4 at the side of a dock on which are supported cargo-containing vehicles.

FIG. 1 illustrates a typical setting for practicing the invention comprising a cargo ship 5, a gantry crane 6 supported on tracks 7 fixed to the top deck of the ship. The tracks are aligned for movement of the gantry crane lengthwise of the ship. A dock or platform 8 supports a truck 9, and a railway flatcar 10 standing on a dockside track.

The gantry crane comprises a bridge 12, a cantilever boom or jib 13 in horizontally telescopic relation with the bridge, an overhead crane 14 horizontally movable along a track 15 mounted on the boom 13, a hoisting implement or "spreader" 16 carrying a plurality of guides 18, and a cable-pulley system of the crane 14 for raising and lowering the implement 16 and any lading attached thereto.

The purpose of the gantry crane assembly (FIG. 1) is to transfer containers 20 between carriers, such as the truck 9 or the flatcar 10 and the interior of the ship 5. The gantry bridge 12 is transferable lengthwise of the ship 5 and the boom 13 is transferable transversely relative to the ship to provide access of the overhead crane 14 to positions directly over a container at any position dockside or interiorly of the ship in vertical alignment with a hatch opening. The ship 5 is preferably equipped with a vertical guide system comprising horizontally spaced columns 22 for receiving a stack of containers 20 with little clearance between the containers and the columns at each side of the stack. Because of the close clearance the container 20 has with the guide structure of the ship, it is important that the spreader 16 is not appreciably larger in its plan or horizontal outline than the plan or horizontal periphery of the container 20. This is desired in order that the spreader may be moved into and out of the ship without interference with its internal container-guiding system. To illustrate this relationship, the spreader 16 coupled with a container 20 is shown in ghost outline within a hatchway of the ship at position A. Preferably, the guide portions 48 to 51 of the spreader extend slightly outside the horizontal outline of the container 20 so that spreader has rolling contact with the vertical ship guides and the containers are protected from abrasive action therewith.

Figure 2:
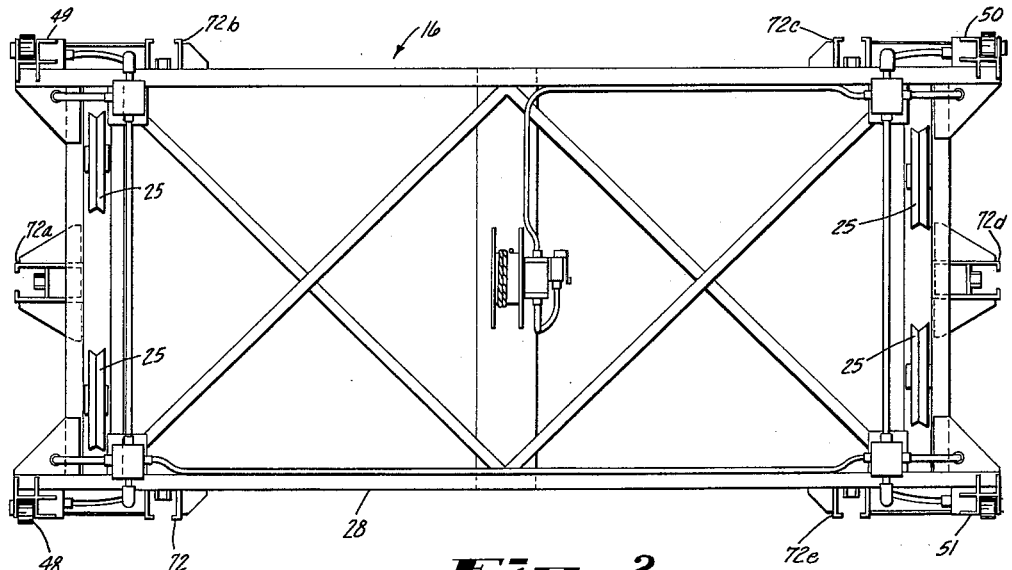
FIG. 2 is a plan view of a hoisting implement or "spreader" adapted to couple directly to a cargo container.
Figure 3:
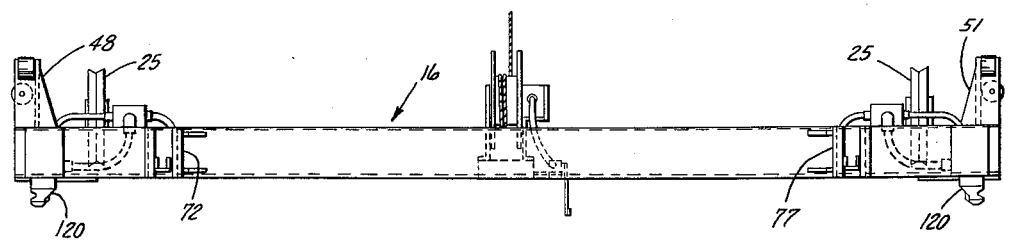
FIG. 3 is a side elevation of the implement of FIG. 2.
Figure 4:
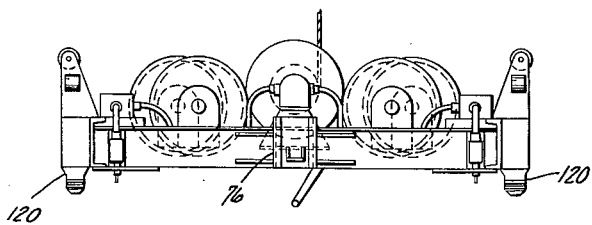
FIG. 4 is an end elevation of the implement of FIGS. 2 and 3.

FIGS. 2, 3, and 4 illustrate the hoisting implement or spreader 14 in substantial detail. The spreader 14, diagrammatically illustrated in FIG. 1, is of generally horizontally-flat, open, frame-like construction and is raised and lowered with respect to a chassis 24 (also of horizontally-flat frame-like construction) of the crane 14 by elevating means, such as the conventional cable and pulley system illustrated. This system comprises pulleys 25 of the spreader interlaced by cables 26 with pulleys 27 mounted rotatably on the chassis 24. This cable system raises and lowers the spreader 16 along a path in approximately fixed relation with the crane 14.

Figure 5:
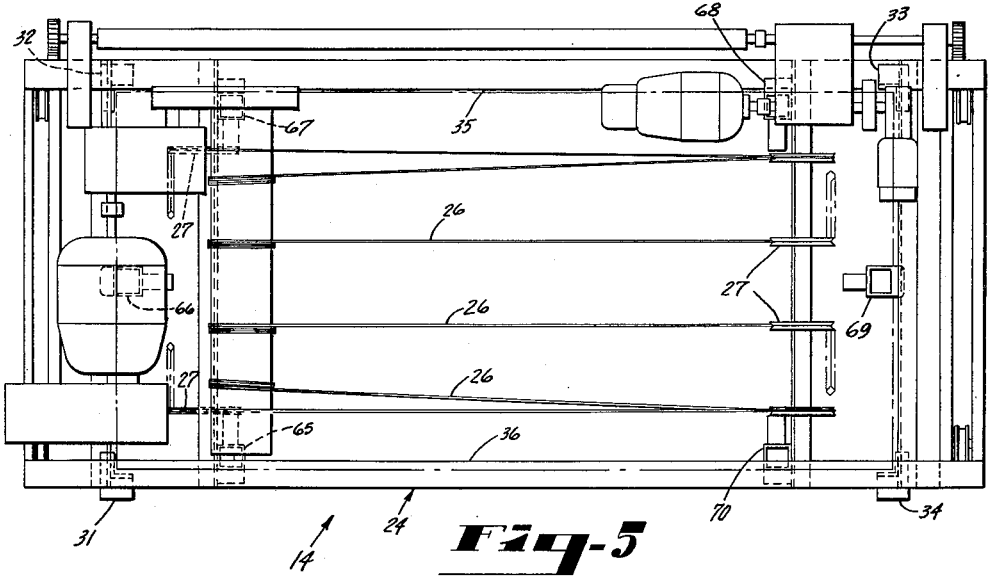
FIG. 5 is a plan view of an overhead crane adapted for horizontal movement lengthwise of the gantry crane of FIG. 1.

To assure that the spreader 16 may always be raised to a precisely located position in subjacent relation with the crane, the spreader and crane are provided with guide portions which overlap at the desired subjacent position. The guide portions of the chassis flare outwardly in a downward direction with respect to a region for receiving the implement to effect vertical alignment correction of the chassis and the implement as the implement is raised to the desired position subjacent to the chassis. As shown in FIG. 5, the chassis 24 of the crane has guide portions 31, 32, 33, and 34. These guide portions are attached to the chassis to its principal transverse channel frame members 35 and 36 by welding or other suitable fabricating method. Referring to FIG. 11 for detailed illustration of guide portion 32, a vertical angle section 38 is attached to the under surface of the beam 35 as by welding. Webs 39 and 41, attached to the section 38, and to the flange 42 and web 43 of the beam, respectively, further stiffen and support the guide 32 relative to the beam. The guide 32 further comprises an apron 45 forming a dihedral angle at 46 extending downwardly and laterally outwardly with regard to the space circumscribed by the guide portions 31 to 34.

The guide portions 31 to 34 cooperate with the guide portions 48 to 51 of the spreader 16 when the spreader 16 is raised into proximity with the crane. This latter group of guide portions projects upwardly as extensions of the frame 28 of the spreader. The purpose of the guide portions of the crane and the spreader is to bring about proper alignment thereof for transferring the guides 18 from the crane chassis to the spreader, or vice versa. A further purpose of the guide portions 48 to 51 is to engage the vertical guides of the ship and thus facilitate the movement of the spreader and a container attached thereto within the ship. Both sets of guide portions also cooperate in preventing swaying or swinging of the container carried by the spreader.

Referring again to FIG. 11, the guide portion 49 of the spreader is seen to comprise a pair of side walls 54 and 55 which meet in a right dihedral angle complementary to the inner angle of the angle section 38 of the guide 32, and a pair of rollers 56 and 57 supported rotatably within the inner angle made by the webs 54 and 55. The rollers 56 and 57 protrude through suitable apertures in the walls 55 and 54, respectively, and beyond the outer surfaces of the walls.

In lifting the spreader into its guide transferring position, initial engagement of the guide portions illustrated in FIG. 11 may occur between the upper tip of the guide portion 49 and the skirt 45 of the chassis guide portion 32. As the spreader proceeds upwardly, the apron 45 urges the spreader into a correct vertical alignment placing the tip within the interior angle defined by the vertical angle section 38. Either or both of rollers 56 and 57 may then engage the inner surfaces of the section 38 as the guide portion 49 moves upwardly into horizontally overlapping relation with this section. The same is true of the other pairs of corresponding frame and spreader guide portions. The guide portions 31 through 34 are spaced in a horizontal pattern which restricts movement of the spreader relative to the chassis to, e.g., one-half inch or less. In this manner, proper vertical alignment of the chassis and spreader is obtained for transfer of the guides 18. Such alignment eliminates the possibility for undesirable frictional disturbances which inhibit the operation of the hold-and-release mechanisms which enable such transfer of the guides.

The essence of the present invention resides generally in the provision of the guides adapted for temporary attachment to a lifting implement when aligning facilities are needed in effecting the coupling of the implement with an article to be lifted, and further adapted for storage on a crane free of the implement during other lifting operations, or during uncoupling of the implement from the article. The mechanism of the invention consists generally of guides which are transferable between the crane chassis and the lifting implement, and elements on both the guides, the chassis, and the implement which are slidably cooperable and which may be selectively controlled to release elements of the guides in engagement with those of either the chassis or the implement to effect transfer of the guides from one to the other.

Figure 6:
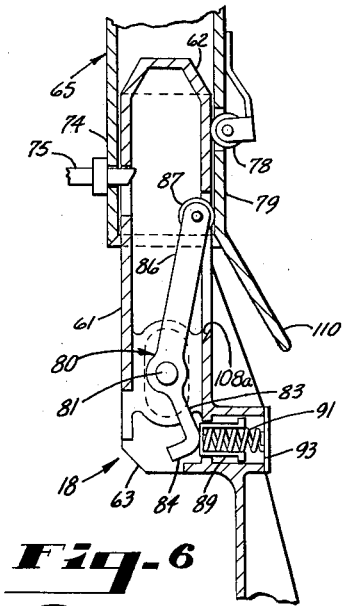
FIG. 6 is a fragmentary elevation in section showing a guide in accordance with this invention for aligning a hoisting implement with a cargo container; the guide is shown as supported by the crane chassis.
Figure 7:
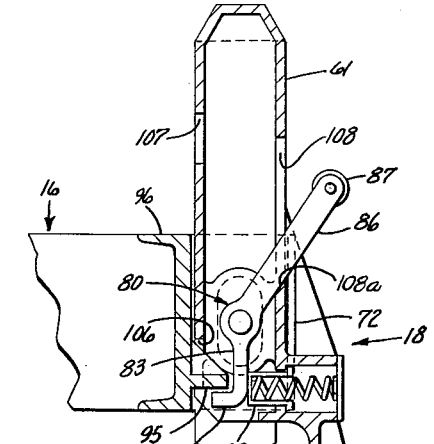
FIG. 7 is a fragmentary elevation in section illustrating the guide of FIG. 6 supported by the hoisting implement of FIGS. 2 to 4.

Referring now to a preferred embodiment, one of the guides 18, as illustrated in FIGS. 6, 7, and 9, comprises a generally rectilinear body 61 which has upper and lower tapered end sections 62 and 63 and is substantially uniform in horizontal cross section.

The guides 18 are detachable and independently portable with respect to the crane and the spreader or implement 16. They are, during operation, supported either by the chassis or the implement in longitudinal alignment along an axis parallel to the path of movement of the implement with respect to the chassis. Except for severe lateral disturbances, the cable pulley system of the crane 14 lowers and raises the implement 16 along a vertical path in approximately fixed relation to the chassis. In the embodiment shown, the chassis and the spreader are equipped to support six guides 18 along six parallel axes defined by receptacles 65, 66, 67, 68, 69, and 70 on the chassis in vertical superposition with open top receptacles 72, 72a, 72b, 72c, 72d, and 72e on the spreader.

The chassis receptacles and the spreader receptacles are of the same general horizontal cross section of which the interior periphery is generally complementary to, in horizontal cross section, but slightly larger than, the exterior periphery of the body 61 of any one of the guides 18. Hence, the guides may be supported by either the crane or the spreader in respective receptacles through selective operation of a latching system herein to be described.

Typical of the open-bottom receptacles attached to the chassis is the receptacle 65 of FIGS. 6 and 9. Both illustrate one of the guides 18 secured at a normal position of support within the receptacle 65. This position is fixed by extension of a solenoid-actuated plunger 75 extending laterally through an inboard wall 74 of the open-bottom receptacle 65. The plunger 75 is actuated by a solenoid 76 within a housing 77 therefore. The body of the guide 18 is urged against the inboard wall 74 by a spring-loaded roller 78 protruding through an opening in the outboard wall 79 of the receptacle 65 into engagement with the lateral surface of the body 61. This arrangement eases the movement of the body of the guide into and out of the receptacle 65 by substantially eliminating frictional binding.

As shown most clearly in FIGS. 6 and 7, the hollow body 61 contains a bell crank or lever 80 rotatably supported on a pin 81 aligned longitudinally along a horizontal axis in fixed relation with the guide. The opposite end portions of the pin 81 are supported in the side walls of the body.

The bell crank or lever 80 comprises a lower arm 83 terminating in a latch 84 extending in transverse relation with the axis of the lever 80 and at right angles with the remainder of the lower arm 83. The lever further comprises an upper arm 86 terminating in a roller 87 positioned against the inboard wall 79 of the receptacle. The arm 86 is urged toward the wall 79 by a small spring (91)-actuated piston 89 acting upon the lower arm 83 to turn the lever 80 in a clockwise direction. The piston 89 and the spring 91 associated therewith are removable from the guide through an opening ordinarily closed by a plug 93 which functions also as a seat for the spring 91.

Figure 8:
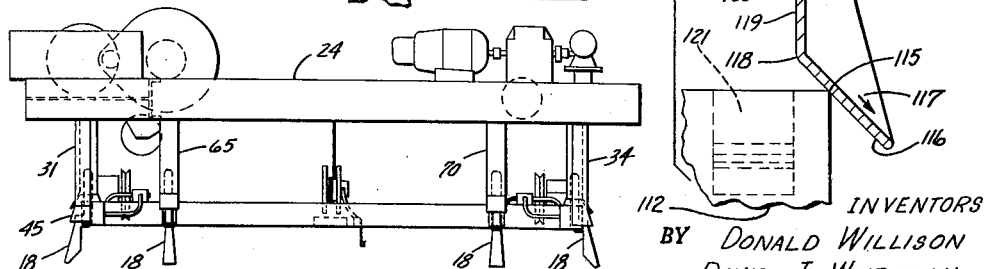
FIG. 8 is a side elevation of the overhead crane, the hoisting implement, and a plurality of guides in accordance with previous figures in guide-transferring position.

The angular relationship of the arms 83 and 86 is such that when the roller 87 engages the wall 79 the latch 84 is laterally offset out of any vertical alignment with a nose-shaped lug 95 fixed to an inboard wall of the spreader 16 defining the space enclosed by an open-top receptacle, e.g., receptacle 72 of FIGS. 7 and 8. In the present instance, this inboard wall is defined by a channel 96 functioning as a main frame member of the spreader. Hence, the receptacle 72 is formed by a pair of brackets 97 and 98, and an outboard surface of the channel 96 extending between the brackets. The guide 18 is positioned at maximum descent within the receptacle 72 by a pair of bosses 101 and 102 of an inverted nose-shaped contour protruding laterally from opposite sides of the body 61. The upper end portions of the brackets 98 and 97 diverge upwardly and outwardly to provide upwardly-facing inclined surfaces which mate complementally with the under surfaces of the bosses 101 and 102 at 103 and 104, respectively.

With the guide 18 seated in the receptacle 72, as shown in FIG. 7 or 9, the body 61 accommodates the lug 95 within a slot 106 which extends within the inboard wall of the body 61 upwardly from its lower periphery to a point just above the upper extremity of the lug. Farther up the inboard wall of the guide along the section thereof adapted to enter the open-bottom chassis receptacle 65 is an aperture 107 adapted for receiivng the plunger 75. The opposite or outboard wall of the guide body contains a vertically-extending slot 108 substantially vertically coextensive with the arm 86 of the lever 80. When the guide 18 is free of the chassis receptacle as shown in FIG. 7, the lever 80 is automatically rotated to carry the arm 86 outwardly of the guide through the slot 108 into a position of rest against a surface 108a of the guide wall defining the lower extremity of the slot 108. This places the roller 87 into a position in vertical alignment with a guide extension 111 of the receptacle 65. As the guide 18 is raised to the position illustrated in FIG. 6, the roller engages the extension 110 and is cammed inwardly relative to the body 61 as the guide approaches latching relationship with the plunger 75. Simultaneously the latch 84 is carried out of latching relation with the lug 95. When the plunger 75 has entered the opening 107, the spreader 16 becomes unlocked from the guide 18. This is also true of various other guides and associated spreader receptacles. The spreader may then be lowered away from the chassis 24 with the various guides 18 secured to the chassis in respective open-bottom receptacles. FIG. 9 illustrates a position of the crane, the spreader, and a guide 18 typical of the instant at which such elevation of the guide 18 has just been completed to obtain entry of the plunger 75 into the opening 107 of the guide.

FIGS. 8 and 9 are also typical of the relative positions of the spreader, the crane, and the guides at which all solenoids analogous to solenoid 76 may be actuated by a conventional electrical circuit to withdraw respective plungers, typified by plunger 75, from the guides 18. If the spreader is then lowered with the plungers retracted, the guides remain seated on the spreader through gravity and pass downwardly out of the open bottom receptacles out of engagement with any portion of the chassis and structure associated therewith.

The spreader 16, with the guides 18 secured thereto in the manner illustrated by FIG. 7, is now in a condition to be lowered into proximity with a container 112 until the lower guide portion of one or more of the guides 18 contact the upper top periphery of the container at 115 along the inclined gathering surfaces 116 of the guides. The descent of the spreader will continue in the direction of the arrow 117 until the corner 118 passes over the peripheral point 115. Descent of the spreader thereafter continues in a substantially vertical direction through guidance provided by the vertical guide surfaces 119 of the six guides 18. Surfaces 119 are particularly helpful in effecting coupling of the spreader 16 with a container when the ship is listing, e.g., when the crane 14 is positioned outboardly, the ship may list up to 6 degrees. Connectors 120 (see FIG. 3), interlock with the container 112 within suitable recesses 121 in the top surface of the container.

FIG. 12 is a side elevation in section of a modified guide 125. This figure is comparable to FIG. 6 of the previously described embodiment. The guide 125 differs from the guide 18 primarily in the construction of the upper arm latch-supporting lever 126 and the structure of the open bottom chassis receptacle 127. The latter cooperates with an upper arm 128 of the lever to effect such rotation of the lever as to withdraw the latch 84 from underneath a lug 195 (analogous to lug 95 of FIG. 7).

In the present embodiment, the guide extension 110 of receptacle 65 of the previous embodiment has, in effect, been embodied in the arm 128 as surface 133. Hence, with the latch 84 positioned under the lug 95, the implement or spreader 16, with the guide 125 in place thereon, may be elevated until the arm 128, leaning outwardly of the slot 131 against the bottom surface 132 thereof, may be lifted upwardly until the guide surface 133 of the arm engages a lower peripheral surface 134 of the receptacle 127. The surface 134 has an inclination complementary to that of the surface 133. As the guide 128 continues upwardly, the surfaces 133 and 134 remain in guide relationship until the heel 135 of the surface 133 passes inwardly of the receptacle. At about this instant, an aperture 137 of the guide passes into registry with the end of the plunger 75 which thereupon enters the aperture 137 to secure the guide within the receptacle 127.

In the same manner as described with respect to the earlier embodiment of FIGS. 6 and 7, the plunger 75 may be withdrawn from the interior of the chassis receptacle 127 to release the guide 126 for positioning it in an open-top receptacle of the implement 16. As the body of the guide passes downwardly out of the receptacle 127, the lever 126 rotates in a clockwise direction to place the latch 84 under the lug 129 of the spreader. The upper arm 128 of the lever is substantially heavier than the lower arm, with the result that the lever is gravity rotated in the clockwise direction.

The means illustrated for coupling the spreader 16 to the container 112, i.e. connectors 120 and recesses 121, is merely exemplary of the various arrangements that may be utilized in using this invention regardless of whether they entail automatic or manual operation. The invention herein described is of broad utility with respect to the system herein disclosed for guiding a hoisting implement into predetermined superjacent relation with a container or other article of known top peripheral contour to be connected with the implement.

The terms and expressions which have been employed are used as terms of description and not of limitation and there is no intention of excluding such equivalents of the invention described or of the portions thereof as fall within the purview of the claims.

What is claimed is:

1. In combination: a hoisting implement; a crane supporting the implement comprising a chassis and elevating means for raising and lowering the implement with respect to the chassis; a guide adapted to be carried by the implement for engaging an article to be lifted by the implement and aligning the implement superjacently with the article for the coupling of one to the other; attaching means comprising elements on the chassis, the implement, and the guide; said elements of the implement and the chassis being relatively interlocking and releasing with respect to the elements of the guide for alternate attachment of the guide to the implement and chassis.

2. In combination: a hoisting implement; a crane supporting the implement comprising a chassis and elevating means for raising and lowering the implement with respect to the chassis along a path in generally fixed relation to the chassis; a guide adapted to be carried by the implement for engaging an article to be lifted by the implement and aligning the implement superjacently with the article for coupling one to the other; attaching means comprising elements on the chassis, the implement, and the guide; the elements of the chassis and the implement being interlocking and releasing with respect to the elements of the guide for attaching the guide alternately to the implement and the chassis; all of said elements being aligned with respect to said path to cooperate slidably in the transfer of the guide between the chassis and implement along an axis in approximately fixed parallel relation with said path.

3. In combination: a hoisting implement; a crane supporting the implement comprising a chassis, and elevating means for raising and lowering the implement with respect to the chassis along a path in generally fixed relation to the chassis; a guide adapted to be carried by the implement for engaging an article to be lifted by the implement and aligning the implement superjacently with the article for coupling of one to the other; attaching means comprising elements on the chassis, the implement, and the guide for attaching the guide alternately to the chassis and the implement; said elements on the implement and the chassis being relatively positioned for supporting the guide along an axis generally parallel to said path and to cooperate slidably with said elements on the guide; said elements of the chassis and the implement being aligned relative to the axis to maintain a fixed alignment of the guide relative to the axis; the chassis and the implement being movable into a position of immediate vertical proximity by operation of said elevating means disposing said elements thereof for simultaneously engaging said elements of the guide; and means for selectively releasing said elements to effect transfer of the guide from the chassis to the implement and vice versa.

4. The combination of claim 3 wherein: the chassis and the implement have vertically extending guide portions in vertically overlapping guiding relationship at said position of vertical proximity; and the guide portions of the chassis are relatively angled with respect to those of the implement for increasing the clearance therebetween in a direction downward from the chassis to cause the guide portions to effect vertical alignment correction of the implement with respect to the chassis as the implement is raised to said position.

5. In combination: a hoisting implement having an open top receptacle; a crane supporting the implement comprising a chassis, elevating means for raising and lowering the implement with respect to the chassis along a path in generally fixed relation to the chassis, and an open-bottom receptacle attached to the chassis; a guide comprising a body having an exterior lateral surface generally complementary in cross section to the interior lateral surface of each receptacle adapting the body for entry into said open top or open bottom and positioning within either receptacle; said receptacles being located on the implement and the chassis along an axis generally parallel to said path in such vertical proximity, when the implement occupies a predetermined position in subjacent relation with the chassis for transferring the guide therebetween, as to simultaneously contain vertically spaced sections of said body; and selectively releaseable detent means comprising parts mounted on both the guide and the receptacles for securing the guide alternately within said receptacles; said guide having a guide surface which, when the guide is secured in said open-top receptacle, extends below said implement for engaging an article adapted to couple with the implement at a predetermined position thereof superjacent the article.

6. The combination of claim 5 wherein: the guide has an extension providing said guide surface, the extension being laterally offset with respect to the body and extending therefrom in a downward, laterally outboard direction with respect to the chassis and the implement.

7. The combination of claim 5 wherein: the guide has an extension providing said guide surface, the extension being laterally offset with respect to the body and extending therefrom in a downward, laterally outboard direction with respect to the chassis and the implement; said extension has a shank connecting it with a lateral surface of the body disposed below the top periphery of the open-top receptacle when the guide is positioned therein; and the open-top receptacle is slotted downwardly from its top periphery to accommodate said shank.

8. The combination of claim 5 wherein: the upper section of the body of the guide has a lateral opening; and the detent means comprises a plunger projecting horizontally through a side wall of said receptacle of the chassis into said opening at said predetermined position, and spring means associated with the plunger; and means for horizontally retracting the plunger, said plunger being retractable from said opening in opposition to said spring means to release the guide from the chassis.

9. The combination of claim 5 wherein: the said body has upper and lower tapered end sections and is substantially uniform in horizontal cross section between said end sections.

10. The combination of claim 5 wherein: the implement has a seat for said body portion defining the lowest position of the guide within the open-top receptacle and said detent means comprises: a plunger supported by the chassis for movement transversely to said axis through an opening in a side wall of the open-top receptacle; said body has a lateral opening for receiving a portion of said plunger at said predetermined position of the chassis and implement; resilient means urges the plunger laterally inward of the open-bottom receptacle; the plunger has an upwardly inclined end surface normally disposed in the receptacle for slidable engagement with an upper end surface of the body whereby the plunger is cammed inwardly of the receptacle side wall; said implement has a downwardly-facing shoulder adjacent said open-top receptacle aligned transversely to said axis; a latch carried by the guide having an upwardly-facing surface disposed at a level below said shoulder when the guide rests on said seat; said latch being reciprocable transversely into and out of horizontally overlapping relation with said shoulder; resilient means supported on the guide urging the latch into said relationship with the shoulder; and control means for shifting the latch transversely to said axis out of said relationship.

11. The combination of claim 10 wherein: said control means comprises a lever pivoted on said guide along a horizontal axis, the lever comprising said latch at a level below said horizontal axis and an upper arm engageable in guide relation with a surface of the open-bottom receptacle for rotating said latch out of said relationship with the shoulder.

12. The combination of claim 10 wherein: said control means comprises a guide extension of said open-bottom receptacle extending downwardly relative thereto and laterally with respect to said chassis; a lever pivoted on the guide comprising said latch and an arm extending into vertical alignment and underneath relation with said extension at a position of the lever placing said latch in subjacent overlapping relation with said shoulder.

13. In a system for handling a cargo container: a hoisting implement; a crane supporting the implement comprising a chassis, and elevating means for raising and lowering the implement with respect to the chassis along a path in generally fixed relation with the chassis; a plurality of guides for engaging, when carried by the implement, the top periphery of the container in aligning the implement vertically thereover; means for attaching each guide alternately to the chassis and the implement comprising elements on the guide and elements cooperable therewith on the chassis and the implement, said elements on the chassis and implement being positioned along axes equal in number to said plurality and generally parallel to said path; said elements on the chassis and the implement along each axis being aligned to cooperate slidably with said elements of the associated guide and to maintain a fixed vertical alignment thereof; said chassis and implement being movable into a position of vertical proximity placing said elements of the chassis and the implement into engaged relation with said elements on the guide; and means for selectively releasing said elements on the guide with respect to the implement and the chassis to effect transfer of the guide from one to the other.

14. The system of claim 13 wherein: each guide has an extension adapted to extend below the implement when the guide is positioned thereon; said extension and corresponding extensions of the other guides being disposed along a horizontal periphery complementary to and slightly larger than said container periphery; each extension having upper and lower guide surfaces in end to end relation facing inwardly of said horizontal periphery; the upper surface being vertical and the lower surface inclining downwardly and outwardly with respect to said horizontal periphery.

15. In a system for handling a cargo container: a hoisting implement having fixedly attached thereto a plurality of open-top receptacles spaced within and closely adjacent to, a horizontal periphery similar to the top outer periphery of said container; a crane for supporting the implement comprising means for raising and lowering the implement with respect to the chassis along a path in generally fixed relation with the chassis; a plurality of guides equal in number to said receptacles for guiding the implement, when supported thereon, into superjacent coupled relation with said container; each guide comprising a body having an exterior lateral surface generally complementary in cross section to the interior lateral surface of one of said receptacles adapting the body portion for entry into said open top and positioning within the receptacle; means for attaching the guides to the chassis comprising cooperating sets of connecting elements on the guides and the chassis; said elements of the chassis being vertically aligned and arranged in a horizontal pattern placing said bodies of the guides, when supported by the chassis, in alignment with respective receptacles along separate axes parallel to said path; and releasable detent means comprising parts mounted on the chassis elements, the receptacles, and the guides; said parts on the chassis and the implement being selectively releasable with respect to said parts on the guide for alternately securing the guide to the chassis and receptacle.

16. In a system for handling a cargo container: a hoisting implement having fixedly attached thereto a plurality of open-top receptacles spaced within, and disposed closely adjacent to, a horizontal periphery similar to the top outer periphery of said container; a crane for supporting the implement comprising elevating means for raising and lowering the implement with respect to the chassis along a path in generally fixed relation with the chassis, and a like plurality of open-bottom receptacles attached to the chassis in a horizontal pattern similar to that of said open-top receptacles; a like plurality of guides, each guide comprising a body having an exterior surface generally complementary in cross section to the interior lateral surfaces of a pair of vertically corresponding open-top and open-bottom receptacles adapting the body for entry into either receptacle; each pair of vertically corresponding receptacles being located on the implement and the chassis, respectively, along a common axis generally parallel to said path and in proximity, when the implement occupies a predetermined position in subjacent relation with the chassis to position vertically spaced sections of the body of the associated guide within both receptacles and releasable detent means comprising parts mounted on each corresponding open-top receptacle, open-bottom receptacle and the guide associated therewith; means for selectively actuating said parts to release the guides from either plurality of receptacles; each guide having an extension, for engaging the container which, when the guide is secured in its corresponding open-top receptacle, extends downwardly and outwardly with respect to said horizontal periphery.

17. The combination of claim 16 comprising: a guide extension of said open bottom receptacle extending downwardly from the outer side of the bottom of said open-bottom receptacle and laterally outwardly with respect to the chassis; a nose-shaped lug extending laterally outwardly from said implement internally of said open-top receptacle providing an undersurface as said shoulder and an upper surface sloping upwardly and inwardly toward the implement; a bell crank supported within said body with respect to a horizontal axis in fixed relation with the guide, said bell crank having a lower arm comprising said latch and an upper arm for engaging the guide extension; said body having two slots in portions of its side wall at opposite sides of said bell crank axis; one slot extending upwardly from the lower periphery of the side wall through which the lug extends into superjacent relation with said latch when the guide rests on said seat; the other slot being substantially vertically coextensive with the upper arm and aligned with respect to the ambit thereof for movement of the upper arm in a lateral direction therethrough into and out of the body; said arms being angularly related to dispose the upper arm in vertical alignment with said guide extension when said latch underlies said undersurface; said upper arm being related to said guide extension to dispose the upper extremity of said upper arm within the body portion adjacent the upper end of the extension when the guide is secured by said plunger in the open-bottom receptacle; said latch, at this latter position of the guide being in horizontally offset relation with said undersurface.

18. A guide for use in aligning a hoisting implement in position for overhead coupling with a cargo container comprising: a normally vertically elongate body, means for alternately attaching the body to the implement and a crane with respect to which the implement is vertically movable; and an extension for engaging the container extending downwardly from, and in laterally offset relation with the body.

19. An implement for hoisting cargo, the implement being constructed within a horizontal periphery complementary to the top periphery of a container to be handled by the implement and comprising a plurality of open-top receptacles horizontally spaced along, and within, said periphery for receiving a like plurality of detachable guides.

References Cited in the file of this patent

UNITED STATES PATENTS

| | | |
|---|---|---|
| 682,175 | Condict | Sept. 10, 1901 |
| 2,847,245 | Leslie | Aug. 12, 1958 |